US006895166B1

(12) United States Patent
Schriebman

(10) Patent No.: US 6,895,166 B1
(45) Date of Patent: May 17, 2005

(54) METHOD AND APPARATUS FOR ENCODING CONTROL DATA IN A VIDEO DATA SYSTEM

(75) Inventor: Jeffrey A. Schriebman, San Rafael, CA (US)

(73) Assignee: Computer Prompting and Captioning Co., Rockville, MD (US)

( * ) Notice: Subject to any disclaimer, the term of this patent is extended or adjusted under 35 U.S.C. 154(b) by 0 days.

(21) Appl. No.: 09/522,108

(22) Filed: Mar. 9, 2000

Related U.S. Application Data

(60) Provisional application No. 60/124,696, filed on Mar. 15, 1999.

(51) Int. Cl.[7] ................................................ H04N 5/91
(52) U.S. Cl. .............................. 386/46; 386/52; 386/95
(58) Field of Search ............................ 386/52, 55, 46, 386/83, 95, 69

(56) References Cited

U.S. PATENT DOCUMENTS

| | | | | |
|---|---|---|---|---|
| 5,677,739 | A | * 10/1997 | Kirkland | ...................... 348/468 |
| 5,844,615 | A | 12/1998 | Nuber et al. | |
| 6,192,187 | B1 | * 2/2001 | Kinghorn | ...................... 386/83 |

OTHER PUBLICATIONS

Author Unknown; "Transport of Internet Uniform Resource Locator (URL) Information Using Text–2 (T–2) Service"; company publication; Sep. 1998; entire document; No. EIA–746–A; Electronics Industries Alliance; Arlington, VA, USA.

Author Unknown; "Recommended Practice for Line 21 Data Service"; company publication; Sep. 1994; entire document; No. EIA–608; Electronic Industries Association; Washington, D.C., USA.

Author Unknown; Transport of Content Advisory Information using Extended Data Service (XDS); company publication; Dec. 1998; entire document; No. EIA–744–A; Electronic Industries Alliance; Arlington, VA, USA.

Author Unknown; "EDS/Caption Encoder"; advertisement; no date; entire document; No. EDS400; Ultech; Seymour, CT, USA.

Author Unknown; "Subtitle/Character Generator"; advertisement; no date; entire document; No. SG401; Ultech; Seymour, CT, USA.

Author Unknown; "Captivator Offline: Closed Captioning & Subtitling Software by Cheetah Systems, Inc."; advertisement; no date; entire document; no volume–issue number; Cheetah Systems, Inc.; Tucson, AZ, USA.

Author Unknown; "Captioning & Subtitling with the CaptionMaker"; advertisement; 1995; entire document; no volume–issue number; Computer Prompting & Captioning Co.; Rockville, MD, USA.

Author Unknown; "Multi–Language Subtitling"; advertisement; no date; entire document; no volume–issue number; Computer Prompting & Captioning Co.; Rockville, MD, USA.

Author Unknown; "Closed Captioning & Subtitling"; advertisement; no date; entire document; no volume–issue number; Computer Prompting & Captioning Co., Rockville, MD, USA.

Author: Federal Communications Commission; "In the Matter of Amendment of Part 15 of the Commission's rules to Implement the Provisions of the Television Decoder Circuitry Act of 1990"; Report and Order; Apr. 12, 1991; entire document; FCC–91–119; FCC: Washington, D.C., USA.

* cited by examiner

*Primary Examiner*—Vincent Boccio
(74) *Attorney, Agent, or Firm*—Mark J. Spolyar

(57) ABSTRACT

Methods and apparatuses for inserting closed-caption and/or other control data into the vertical blanking interval of a video image data stream without the use of special encoding hardware.

40 Claims, 19 Drawing Sheets

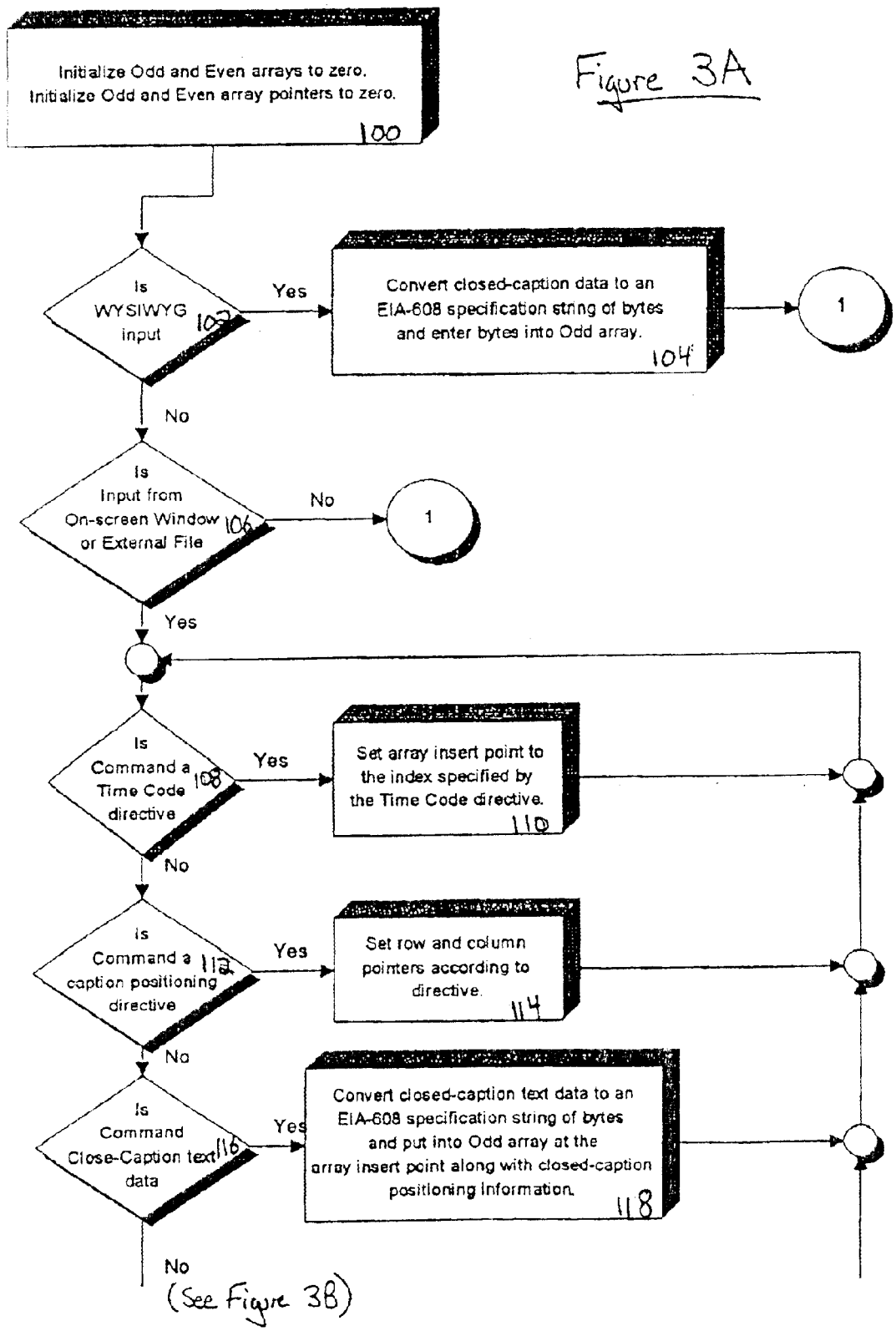

PROGRAM INFORMATION WINDOW

Name: [      ]       Length Hours [none ▼]  Min [none ▼]

Basic Keyword Group

☐ Education  ☐ Entertainment  ☐ Movie  ☐ News  ☐ Religion  ☐ Sports  ☐ Other

Detail Keyword Group   (0 detail items, 0 total)

| | | | | |
|---|---|---|---|---|
| ☐ Action | ☐ Concert | ☐ Football | ☐ Instruction | ☐ Nature | ☐ Series |
| ☐ Advertise... | ☐ Consumer | ☐ Foreign | ☐ Internat... | ☐ Police | ☐ Service |
| ☐ Animated | ☐ Contemporary | ☐ Fund Raiser | ☐ Interview | ☐ Politics | ☐ Shopping |
| ☐ Anthology | ☐ Crime | ☐ Game/Quiz | ☐ Language | ☐ Premiere | ☐ Soap Opera |
| ☐ Automobile | ☐ Dance | ☐ Garden | ☐ Legal | ☐ Prerecorded | ☐ Special |
| ☐ Awards | ☐ Documentary | ☐ Golf | ☐ Live | ☐ Product | ☐ Suspense |
| ☐ Baseball | ☐ Drama | ☐ Government | ☐ Local | ☐ Professional | ☐ Talk |
| ☐ Basketball | ☐ Elementary | ☐ Health | ☐ Math | ☐ Public | ☐ Technical |
| ☐ Bulletin | ☐ Erotica | ☐ High School | ☐ Medical | ☐ Racing | ☐ Tennis |
| ☐ Business | ☐ Exercise | ☐ History | ☐ Meeting | ☐ Reading | ☐ Travel |
| ☐ Classical | ☐ Fantasy | ☐ Hobby | ☐ Military | ☐ Repair | ☐ Variety |
| ☐ College | ☐ Farm | ☐ Hockey | ☐ Miniseries | ☐ Repeat | ☐ Video |
| ☐ Combat | ☐ Fashion | ☐ Home | ☐ Music | ☐ Review | ☐ Weather |
| ☐ Comedy | ☐ Fiction | ☐ Horror | ☐ Mystery | ☐ Romance | ☐ Western |
| ☐ Commentary | ☐ Food | ☐ Information | ☐ National | ☐ Science | |

[ Clear Keywords ]        [ Cancel ]    [ OK ]

FIGURE 12

Interactive Television Link Generator

| | |
|---|---|
| URL | http://www.leapfrog.com |

Type: ● none   ○ network   ○ sponsor
      ○ program   ○ station   ○ operator

Name: Audience Prompt

Expires  Year [none]  Month [none ▼]  Day [none ▼]
         Hour [none ▼]  Min [none ▼]  TZ [PST ▼]

Script: [                    ]

View   ○ TV   ● Web              ☒ Abbreviated

`<http://www.leapfrog.com>[n:Audience Prompt][EFBD]`

[Cancel]  [OK]

Figure 13

METHOD AND APPARATUS FOR ENCODING CONTROL DATA IN A VIDEO DATA SYSTEM

RELATED APPLICATION

This application claims the benefit of U.S. provisional application Ser. No. 60/124,696 filed Mar. 15, 1999.

FIELD OF THE INVENTION

The present invention relates to closed-captioning and other data appearing on the vertical blanking interval of a video image signal. More particularly, the present invention relates to an apparatus and method for the addition of closed captioning and other control data to a video or television program.

BACKGROUND OF THE INVENTION

Closed-captioning is the synchronized display of textual data with the underlying video program. In other words, closed-captioning allows a program viewer to see the video image on screen, while simultaneously reading the underlying dialogue instead of having to hear it. Traditional techniques for adding closed-captions to video data require expensive, special-purpose synchronization software and encoder hardware.

The closed-captioning of video programs is typically done in two stages. In the first stage, an enhanced dialog text script is created in a word processor and an association is made between each piece of text and a specific time sequence within the video program during which the text is to be displayed. This synchronization process is typically done by a skilled technician using a computer and associated software to associate a time code to the desired text.

In the second stage, the time-coded closed-caption data is merged with the underlying video program. Prior art methods of merging the closed-captioning and video image data require the use of dedicated and expensive closed-captioning systems. See FIG. 1. These systems include separate hardware, typically referred to as a closed-caption encoder 3. In a typical prior art system, the encoder 3 accepts a video signal from a playback VCR 2 playing a master video tape and simultaneously accepts from a computer 1 the closed captioning instructions created in the first stage. When the encoder 3 recognizes the appropriate time code it formats the associated textual/closed-caption data according to the Electronic Industries Association Standard EIA-608, Recommended Practice for Line 21 Data Service (incorporated by reference herein), and superimposes the formatted data onto the video data stream emanating from the master tape. A record VCR 4 records the output of the encoder. In this manner, the closed-caption data is placed onto line 21 of Vertical Blanking Interval (VBI) of the video data signal by the encoder. The resulting output video tape is designated as a close-captioned encoded submaster video tap.

The U.S. Federal Communications Commission specified through the Television Decoder Circuitry Act of 1990 (Decoder Act) and subsequent FCC legislation that all television receivers imported into the United States or sold in interstate commerce after Jul. 1, 1993 with a screen size greater than 13 inches must be capable of decoding and displaying closed-captions. The Decoder Act and corresponding regulations were put into effect to make closed-captions more readily available to the hearing impaired and to provide the television broadcast industry with an ever expanding base of closed-caption capable television receivers.

From a slow beginning closed-caption programming has gradually gained momentum to a point where television programming that contains closed-captioning is the norm. Prior to the development of the present invention, a video production house desiring to add closed-captioning to its program had three options. First, the production house could send a master tape of its program with the dialog script to a third-party closed-captioning company. Second, the production house could purchase closed-captioning software and generate the commands required to drive a hardware encoder that is operated by a third-party closed-captioning service. Lastly, the production house could purchase expensive closed captioning equipment and perform the entire closed-captioning process itself.

Faced with this type of up front capital expenditure and the costs of the various closed-captioning options, it is desirable to find an alternate way of close-captioning a video program. Furthermore, since the use of the vertical blanking interval for the transmission of other control data, such as Content Advisory information and Uniform Resource Locator information in Interactive Television programs, is becoming more widespread, an effective and inexpensive method and apparatus are needed to add such control data to the underlying video image data.

SUMMARY OF THE INVENTION

Video programming is increasingly being edited on digital computers. Computer based video non-linear editing (NLE) systems can store in digital form an entire video program. Some digital video editing systems typically store only the image portion of the video program and regenerate the vertical blanking interval (VBI) when displaying video material. However, some non-linear editing systems digitize the last line of the vertical blanking interval and allow storage, editing and playback of that line. For example, certain industry standard digital video editing systems such as the Apple Macintosh based Avid Media Composer series with the Advanced Broadcast Video Board (ABVB) manufactured by Avid Technology, Inc. and the Apple Macintosh based Media 100 series NLE with software Release 5 manufactured by Media 100, Inc. will map a portion of the visual image area of the editing system into the VBI. This mapping occurs near the first line of the visual image so that pictorial data properly positioned near line 1 of the visual image within the editing system can be mapped to the odd and even lines of Line 21 of the VBI of a television signal. The present invention, in one embodiment, takes advantage of the above-mentioned capabilities of these and other non-linear editing systems.

The present invention provides methods and apparatuses for inserting closed-caption and/or other control data into video stream data. One embodiment inserts control data into the vertical blanking interval of a video image data stream without the use of special encoding hardware. One embodiment of the present invention provides a software solution to inserting VBI data service codes onto video programming using non-linear editing system hardware, which many video production houses already possess. One method of the present invention generally comprises generating an image data file including a pixel representation of the desired control data and merging the control image data file with an underlying program video image data file. Control data is any non-video information normally appearing in he vertical blanking interval, or other non-image portion, of a television signal that is processed by a decoder or controller, including, but not limited to, closed captioning information, Content Advisory information, and Uniform Resource Locator (URL) information.

The apparatus, in one embodiment of the present invention, facilitates input of closed-caption or other control data from a WYSIWYG text editor, other dialog boxes, or external data files containing control data and command directives. Other control data may include, for example, Internet Uniform Resource Locator information used by an Interactive Television controller and Content Advisory information, as well as program name, program type, program length and time-in-show information. This information can be manually entered using the text editor or an on-screen window, or accepted from a preexisting computer text file containing command directives that instruct how and when the data is to appear in the vertical blanking interval of the video signal. From this information, the present invention generates a data structure that temporally arranges the control data as appropriate for further use. In one embodiment, the apparatus creates an image data file which encodes the closed caption information, Content Advisory information and/or Interactive Television Link information. In one embodiment, the present invention generates an image data file comprising a series of visual gray scale representations of the binary codes that represent the Line 21 waveform of the VBI. Of course, the present invention can be applied to other waveform protocols and to other lines of the VBI. According to the present invention, a non-linear video editor of the type described above recognizes the resulting control image data file as standard digital video picture data. Accordingly and in one embodiment, the user merges the control image data file and the video program using standard operations provided by the non-linear video editing system.

In some embodiments, the present invention encodes closed caption information according to the format disclosed in Electronic Industries Association Standard EIA-608, Recommended Practice for Line 21 Data Service. Preferred embodiments of the present invention encode program rating information according to the specifications set forth in the Transport of Content Advisory Information using Extended Data Service (XDS) EIA-744-A, which is incorporated by reference herein. Lastly, certain embodiments of the present invention encode interactive television link information according to the Transport of Internet Uniform Resource Locator (URL) Information Using Text-2 (T-2) Service EIA-746-A, which is incorporated by reference herein.

DETAILED DESCRIPTION OF THE DRAWINGS

Figure 3B:
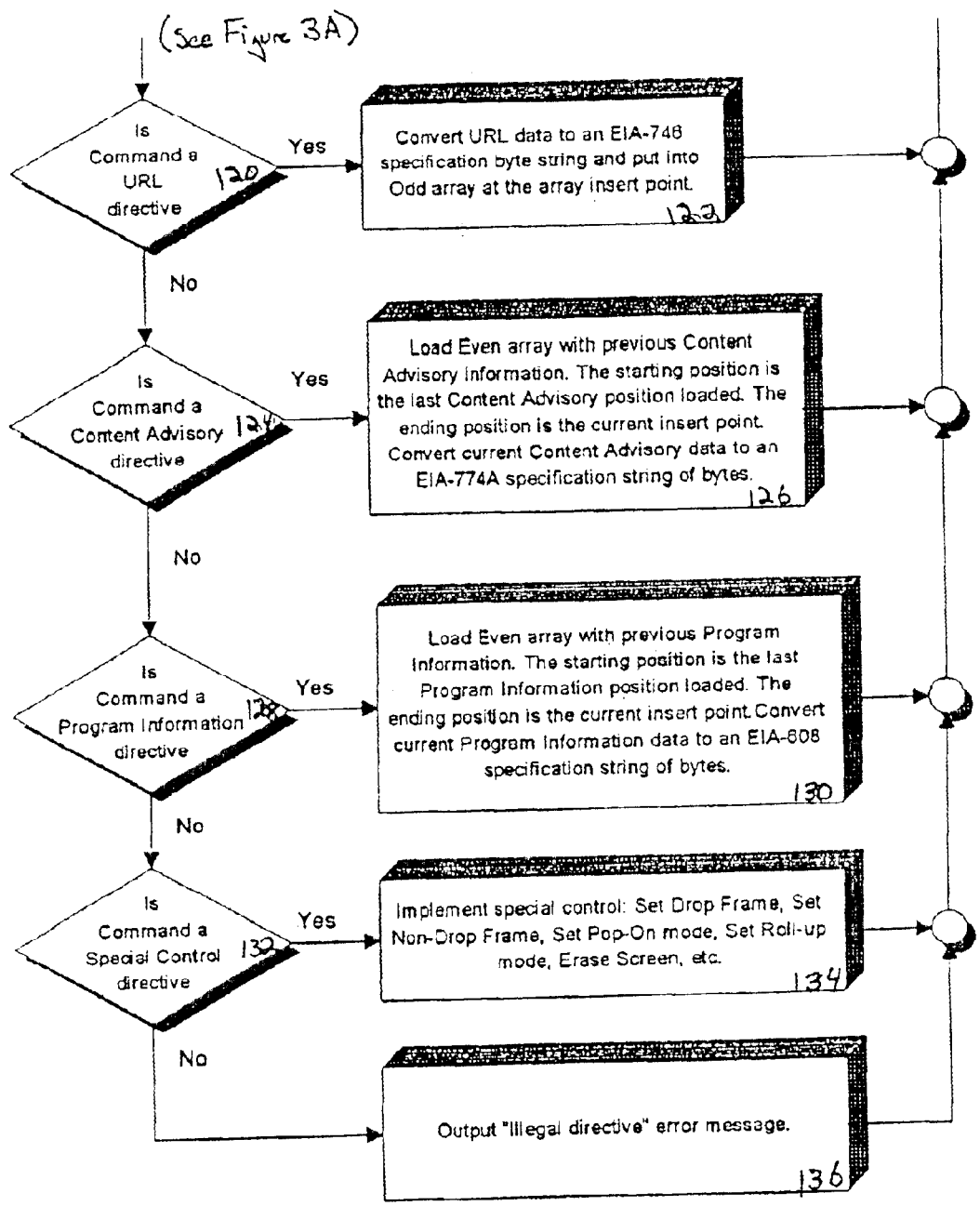
Figure 3C:
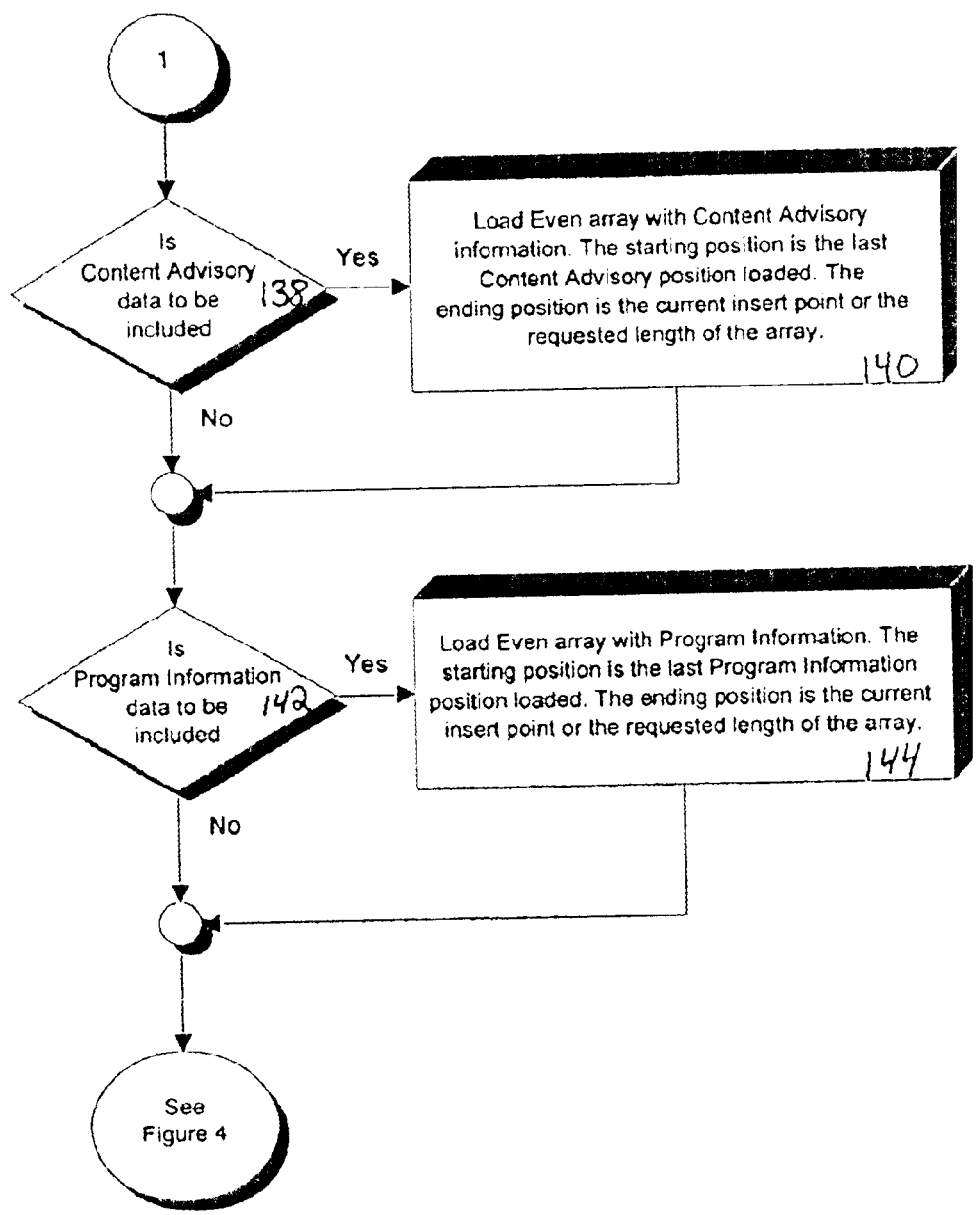

FIGS. 3A, 3B and 3C comprise a flow chart diagram of a process for receiving and placing control data into two data arrays corresponding to Field 1 and Field 2 of Line 21 of the vertical blanking interval.

Figure 4:
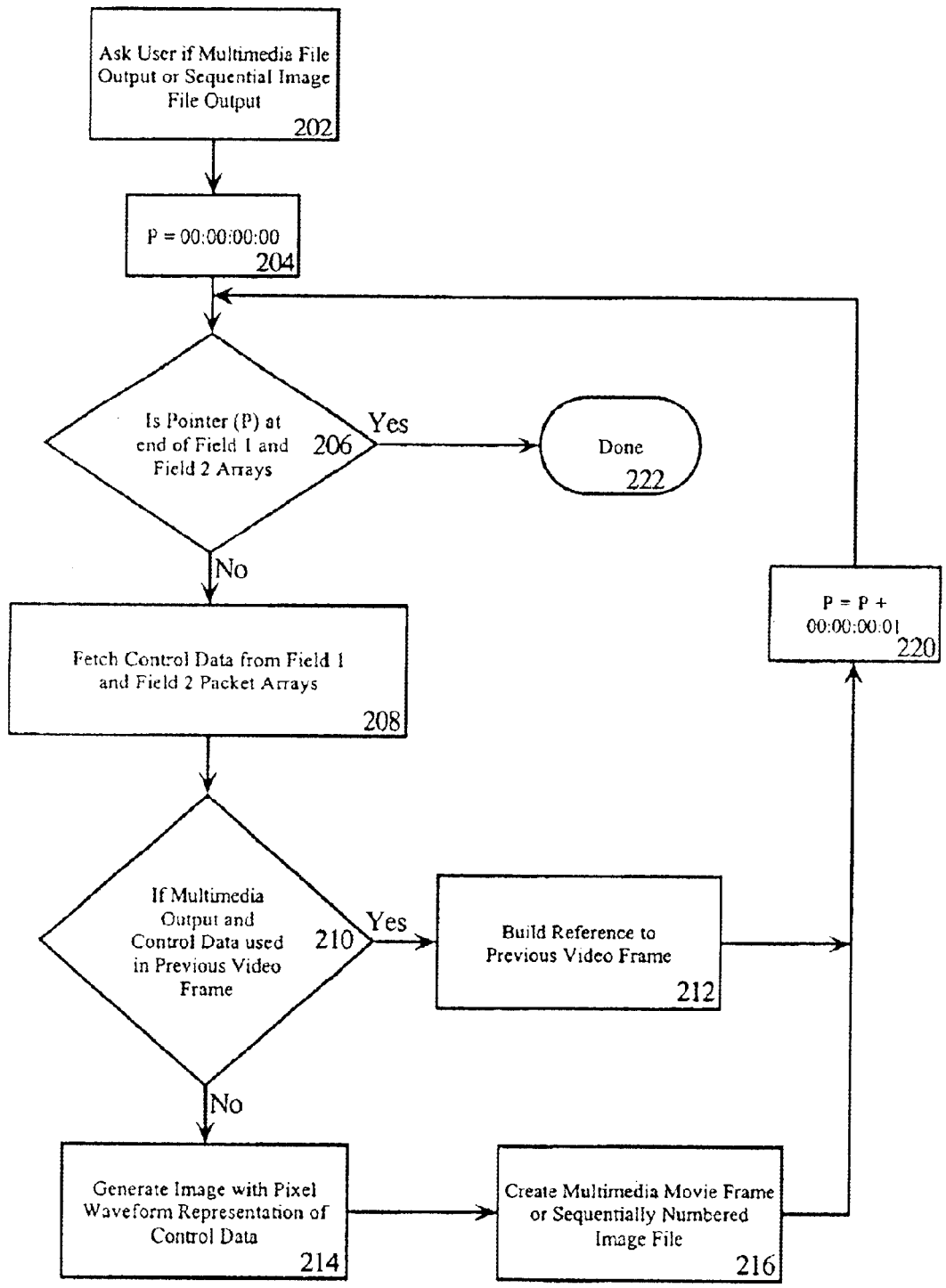

FIG. 4 is a flow chart diagram illustrating a method for generating pictorial representations of the Field 1 and Field 2 packet waveforms of Line 21 using the data contained in the arrays which contain control data.

Figure 5:
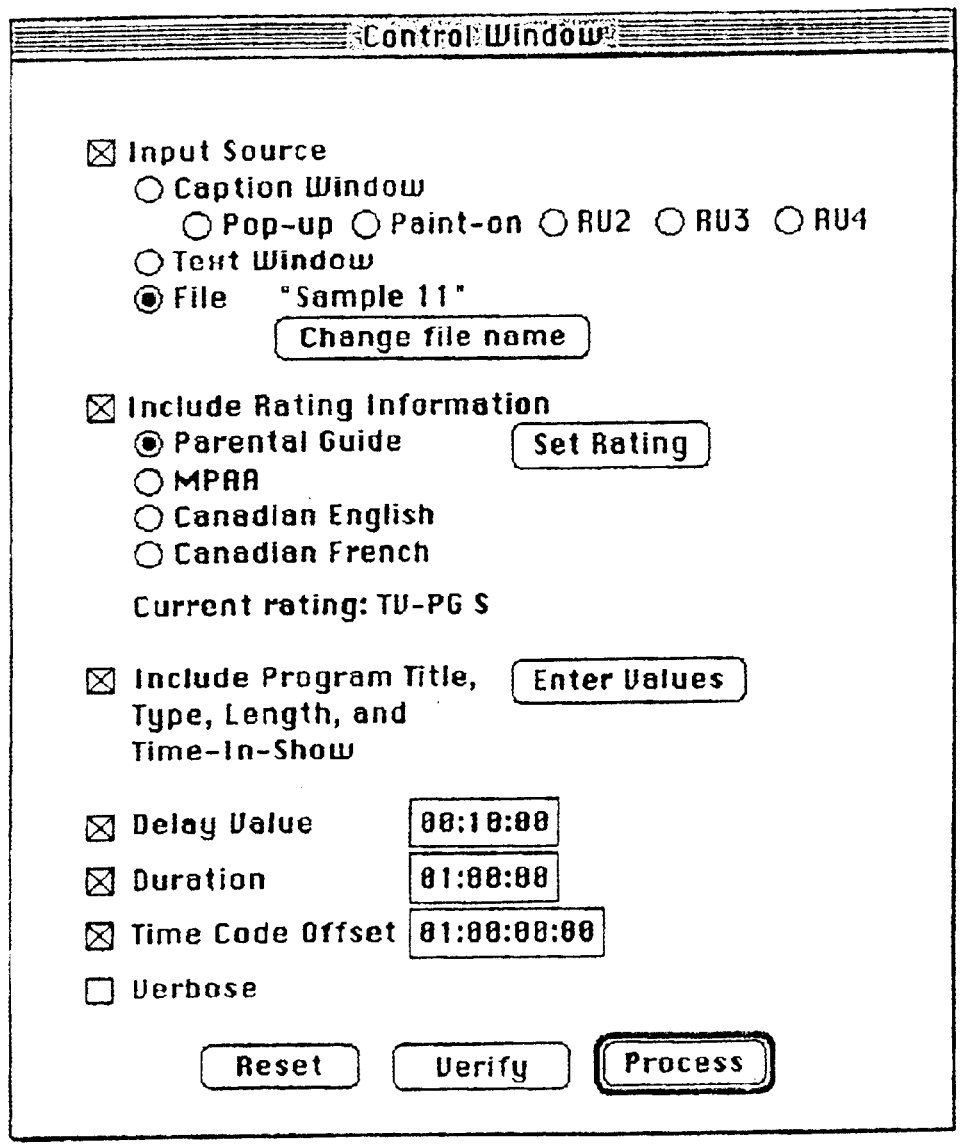

FIG. 5 shows a dialog box called "Control Window" illustrating the various control data input options provided by one embodiment of the present invention.

Figure 6:
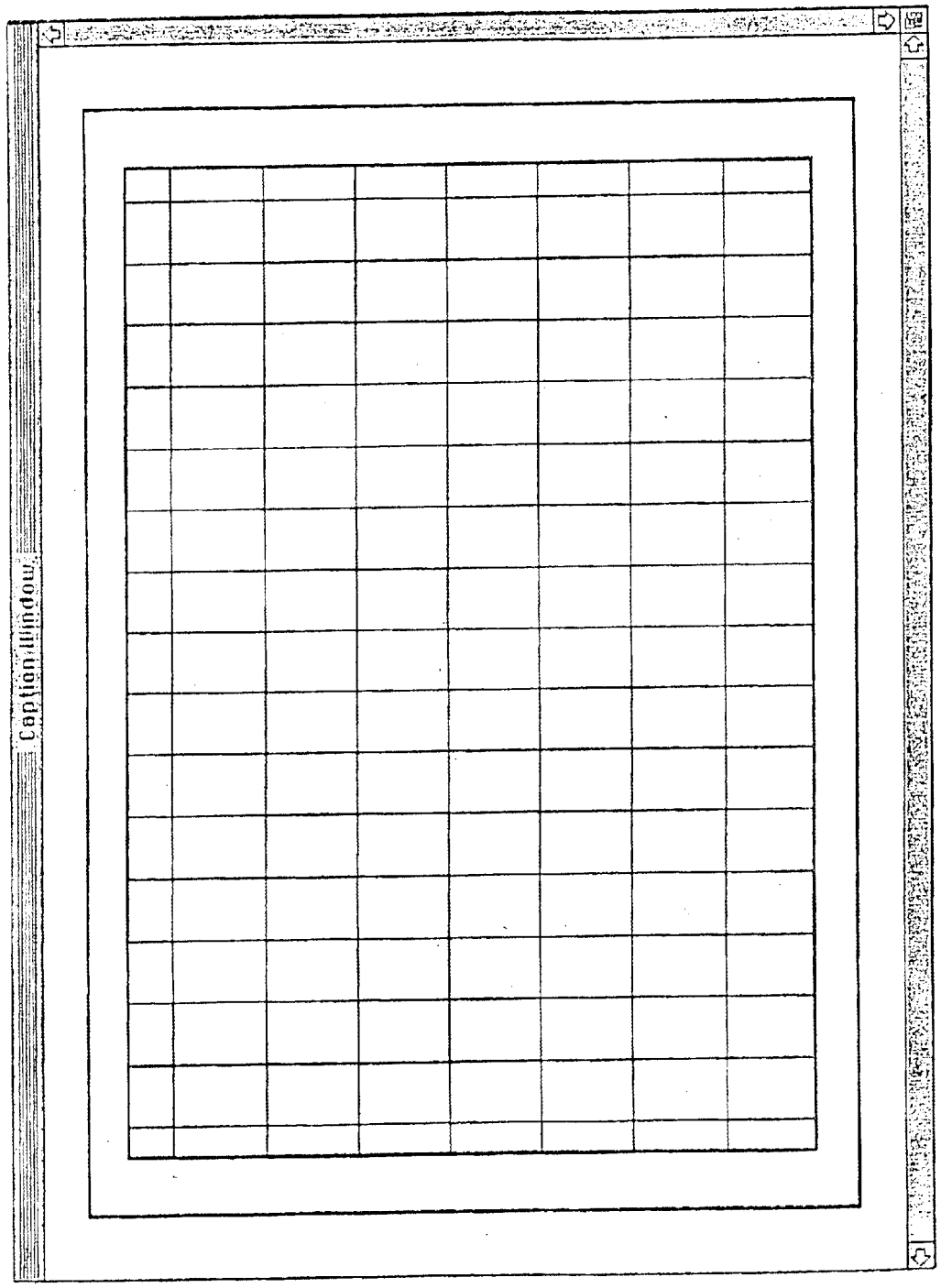

FIG. 6 illustrates a caption window box, which according to one embodiment of the present invention, allows for the entry of one closed caption.

Figure 7:
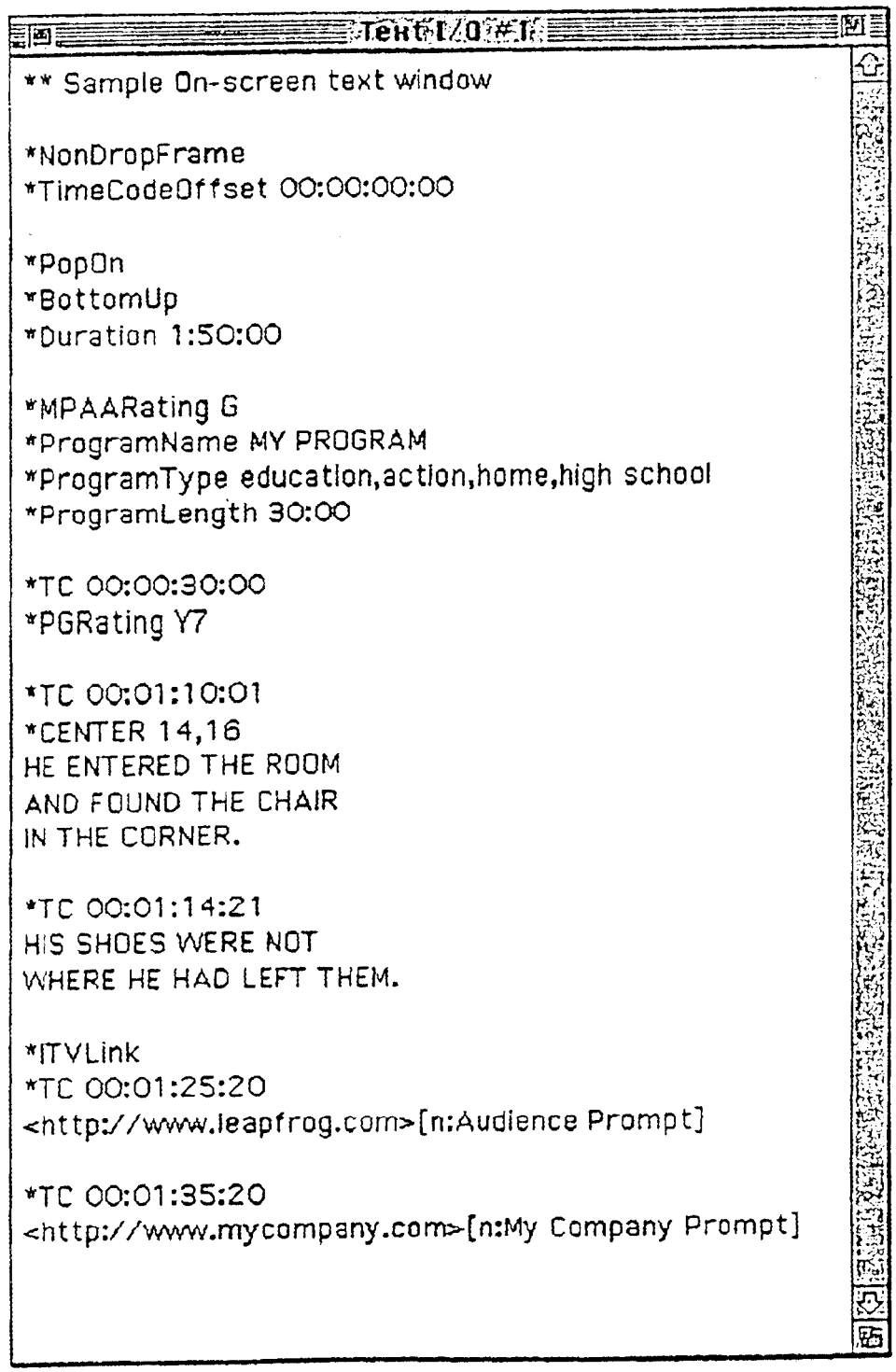

FIG. 7 shows a text window box into which command directives have been entered.

Figure 8:
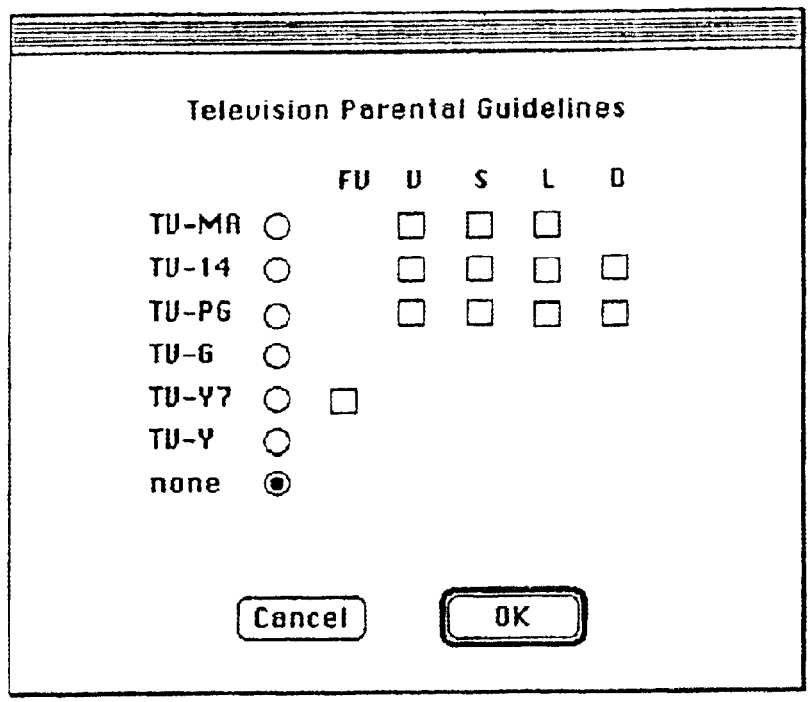

FIG. 8 shows a dialog box presented by an apparatus according to the present invention which allows for the entry of Television Parental Guideline information.

Figure 9:
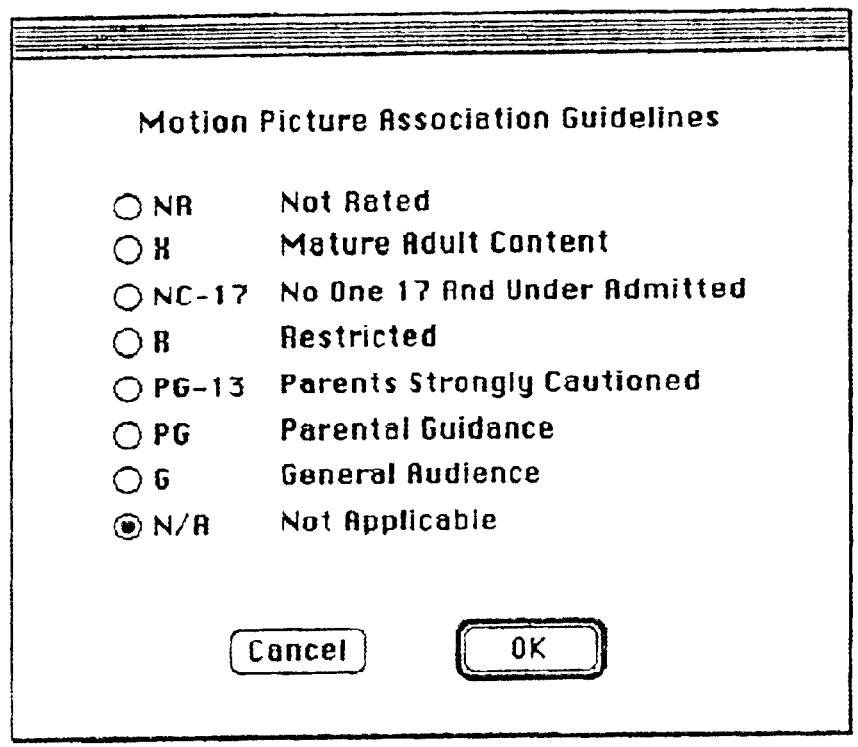

FIG. 9 is a dialog box allowing for entry of Motion Picture Association Guideline ratings.

Figure 10:
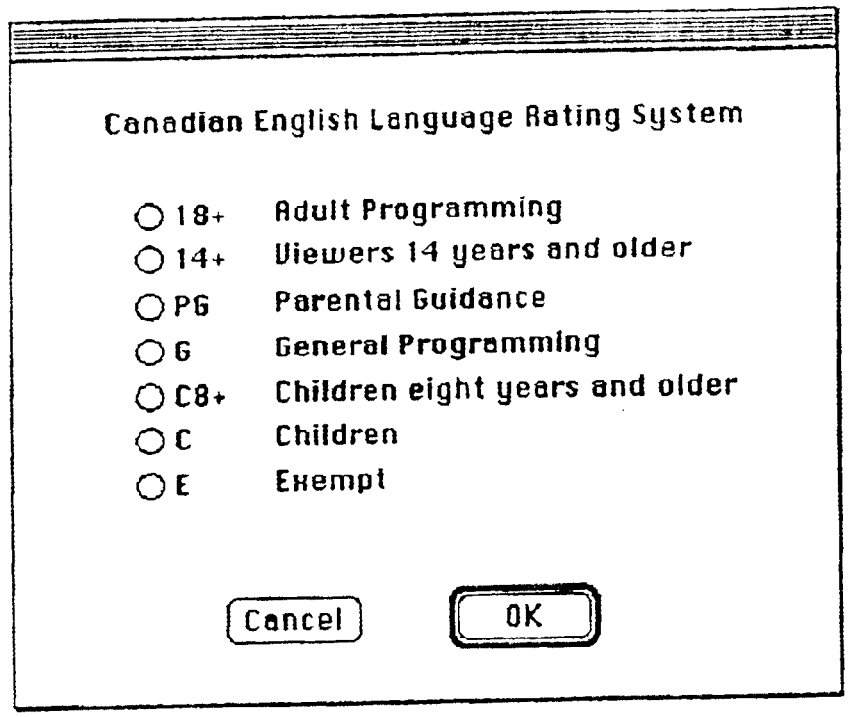

FIG. 10 shows a dialog box providing for the entry of ratings according to the Canadian English Language Rating System.

Figure 11:
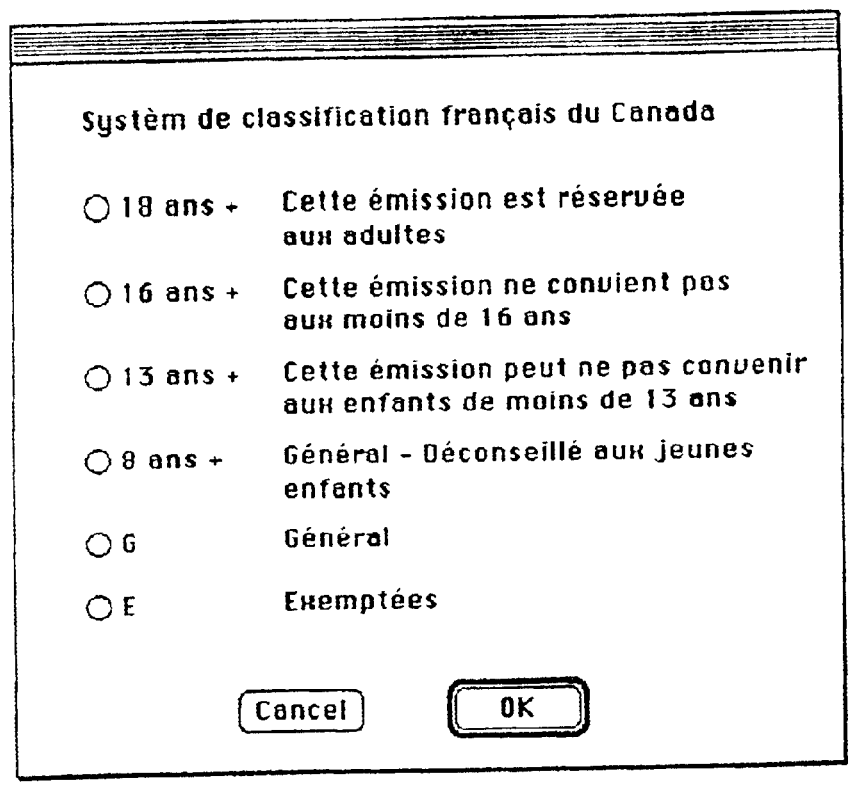

FIG. 11 shows a dialog box providing for the entry of ratings according to the Canadian French Language Rating System.

FIG. 12 shows a dialog box that facilitates entry of Program Information.

FIG. 13 illustrates a dialog box allowing for entry of Uniform Resource Locator information.

Figure 14:
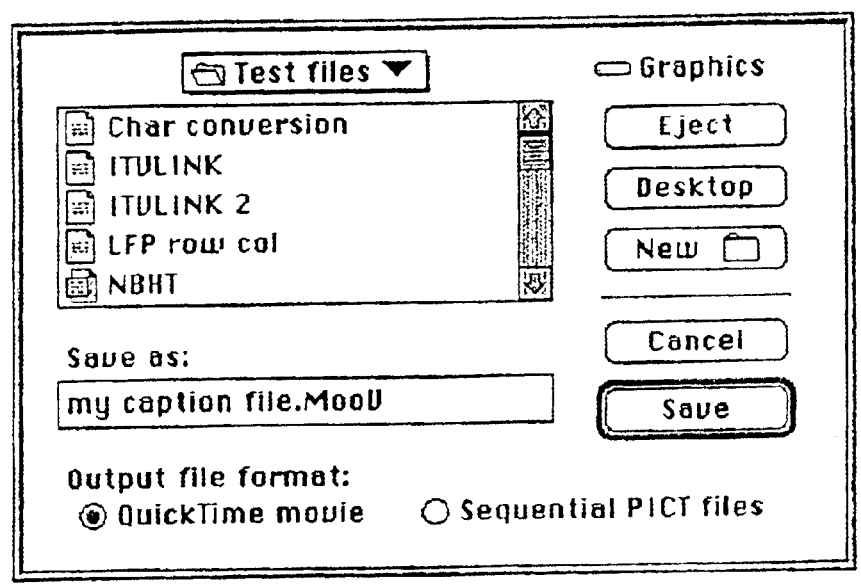

FIG. 14 illustrates a dialog box which allows the user to specify the name and address of the output file, as well as whether the resulting picture images containing the gray-scale waveforms will be in a Quick Time movie or PICT file format.

Figure 15:
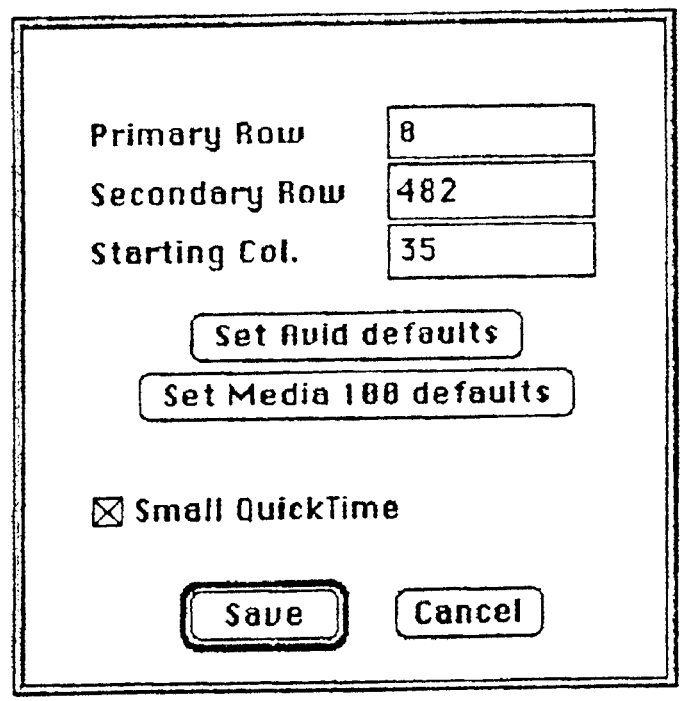

FIG. 15 shows a dialog box in which the user sets the lines in the picture images on which the gray scale waveforms will be placed.

Figure 16:
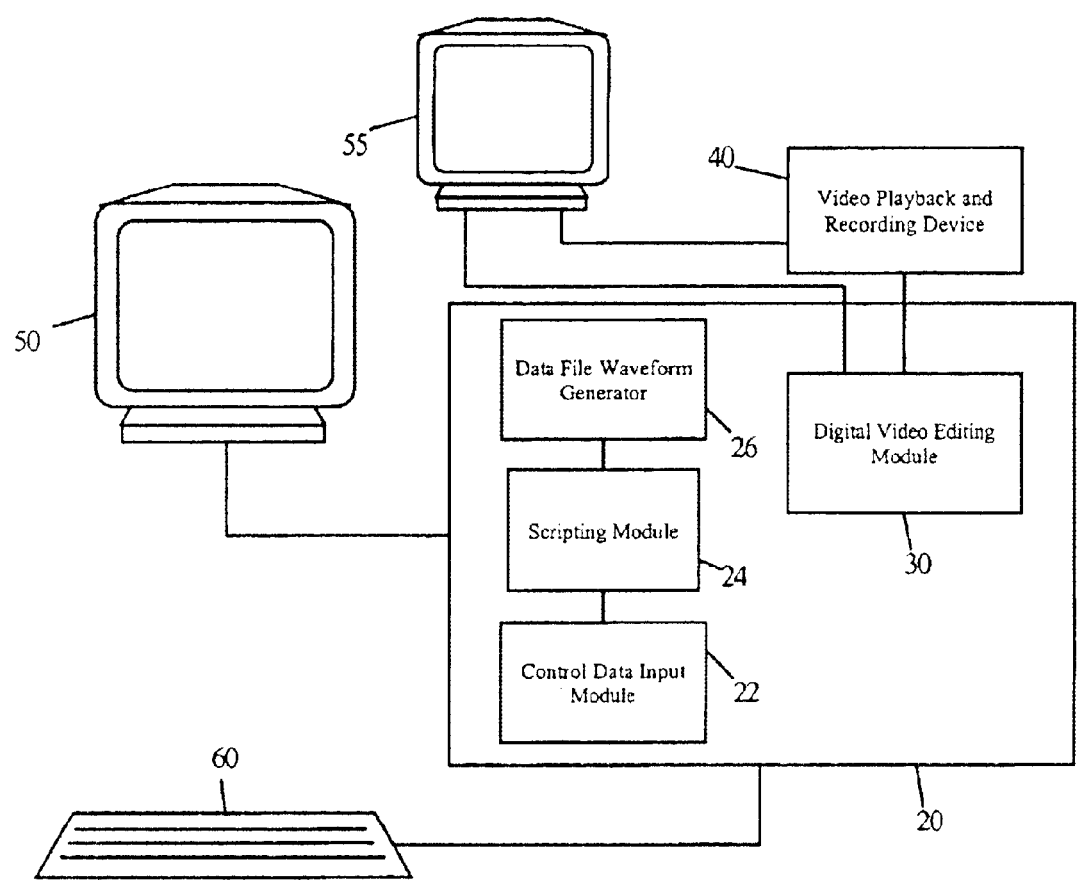

FIG. 16 illustrates an apparatus embodying the principles of the present invention.

Figure 17:
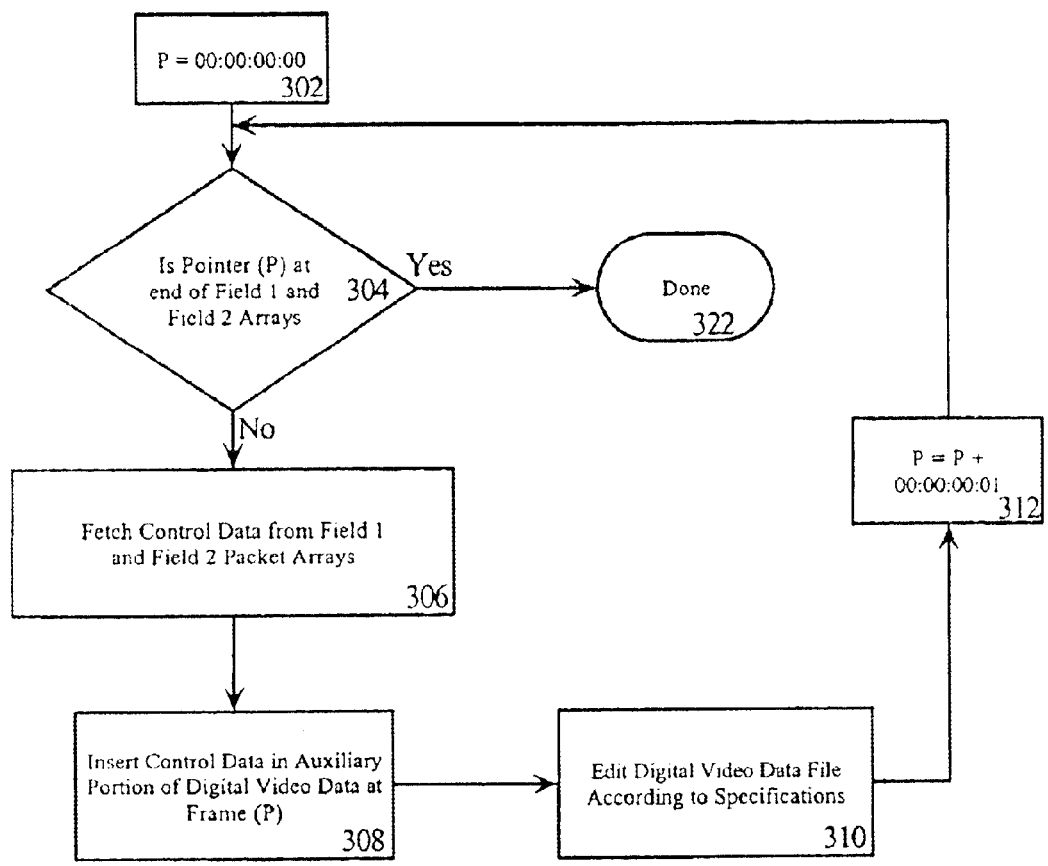

FIG. 17 is a flow chart diagram setting forth a method for adding control data to a digital video data stream.

DETAILED DESCRIPTION OF THE INVENTION

In the art, data service information, including closed-captions, content advisory information, and Internet Uniform Resource Locator (URL) information, is transmitted simultaneously with the video image itself on the even and odd video fields of Line 21 of the vertical blanking interval of a television signal. Embodiments of the present invention insert control data into data structures whose elements represent points in time or image frames. The data structure is used, in one embodiment, to create a gray-scale, pictorial representation of the Field 1 and Field 2 Line 21 waveforms that include the desired control data. (See FIG. 2). The Field 1 and Field 2 gray scale data waveforms are placed into a digital picture image. This allows a non-linear editing system to map the gray-scale waveform onto Line 21 of the vertical blanking interval of the underlying video image data to add the desired control data to the video output. The present invention, however, is not limited to encoding data to Line 21 of the vertical blanking interval and can be used to encode control data on any non-video portion of a video signal. In another embodiment, the control data as temporally arranged in the data structure is used to encode a digital video data stream with closed captioning and other control data.

FIG. 16 illustrates an embodiment of the apparatus according to the present invention. As FIG. 16 shows, one embodiment comprises video playback and recording device 40 operably connected to computer 20. In the embodiment of FIG. 16, computer 20 includes control data input module 22 and scripting module 24. In embodiments used in connection with non-linear editing systems recording analog video streams, computer 20 further includes data file waveform generator 26. In one embodiment, computer 20 includes digital video editing module 30. In another embodiment, digital video editing module 30 can be a device physically separate from, but operably connected to, computer 20. In the embodiment shown, the apparatus also includes keyboard 60 and display device 50 and video monitor 55. Other embodiments may further include other input devices such as a mouse or joystick controlling a pointer displayed on display device 50. In one embodiment, the functionality of the present invention can be incorporated into conventional video editing systems.

Computer 20 can be any computer, special-purpose computing device, or any other suitable device for performing the required functionality. In one embodiment, user computer 20 includes at least one processor, a data storage system (including volatile and non-volatile memory, such as a hard drive), at least one input/output device, such as a floppy disk-drive and/or CD-ROM. In one embodiment, video playback and recording device 40 is a VCR device. However, video playback and recording device 40 can be any suitable device for playing back and recording video stream data or digital video stream data stored on any suitable medium. In addition, the functionality performed by computer 20 may be implemented in hardware or software, or a combination of both. In one embodiment, control data input module 22, scripting module 24, data file waveform generator 26, and digital video editing module 30 comprise executable program code, which when loaded RAM are executed by computer 20.

A. Inputting Control Data

1. User Interface for Inputting Control Data

A first aspect of the present invention is the acquisition of desired control data and its arrangement in a data structure. In one embodiment, control data input module 22 includes functionality providing user interfaces facilitating the input of control data. FIG. 5 illustrates a dialog box presented by an embodiment of the present invention which allows the user to choose the form in which control data is inputted. Certain embodiments of the present invention allow for three distinct sources of input: (a) a WYSIWYG editor that allows the user to enter, position and modify one closed-caption (FIG. 6); (b) an on-screen portion that allows the user to enter control data and command directives into a computer Window (FIG. 7); or (c) an external data file that can contain a list of previously prepared control data script comprising control data and command directive (see "File" in FIG. 5). The external data file can be an ASCII text file or a closed-caption description file prepared by another closed-caption vendor.

In one embodiment, the WYSIWYG editor provides for input, screen positioning and editing of closed-caption text. In one preferred embodiments, this is done on a 15 column by 32 row screen matrix. FIG. 6 illustrates a caption window where each box represents two character spaces and each half-box represents one character space. Closed-caption characters may have specific colors, or specific attributes such as italic, underline or flash. In one embodiment, attribute information associated with each character is stored together with the character. For this reason, the internal storage of each character in preferred forms of the WYSIWYG editor consists of a 16 bit quantity; 8 bits for the character and 8 bits for its attribute. In addition, as FIG. 5 shows, the user may select standard closed-caption display options for use with the closed-caption text to be displayed. More specifically, the user may select "pop-up" or "paint-on" display modes for the closed-caption text, as well as "roll-up 2," "roll-up 3" and "roll-up 4" display modes. In one embodiment, the selection of a particular display mode affects the command and special directives that control entry of control data into the output arrays and, ultimately, how the closed-captioning is displayed on the television screen. (See discussion, below.)

As FIG. 5 indicates, embodiments of the present invention also include the ability to generate ratings for the Television Parental Guidelines system, the Motion Picture Association of America (MPAA) Guidelines system, the Canadian English Language Rating System, and the Canadian French Language Rating System. Certain embodiments feature dialog boxes (see FIGS. 8, 9, 10 and 11) that allow the user to enter the desired rating information. Other embodiments include dialog boxes that allow the user to generate interactive television links or URLs. (See FIG. 13.)

In addition, the control data described above can be manually scripted using an on-screen window (FIG. 7) or can be contained in a previously prepared external data file containing the closed-caption, Content Advisory information and any other control data. When the on-screen window or an external data file is used, one embodiment parses the command directives to enter the associated control data in the appropriate elements in two output arrays, described below. In one form, command directives consist of instructions and time code specifications that describe how and when the control data information is to be carried on Line 21 of the VBI. These command directives or instructions allow for the selective and/or appropriate placement in time in the video data stream closed-caption data, content advisory information (e.g., MMPA program rating specification), Program Title, Type and Time-In-Show, and Internet Uniform Resource Locator (URL) information (i.e., Interactive Television Link specifications). In one embodiment, these command directives are a language used to instruct the temporal arrangement and storage of control data for later use. In one embodiment, the present invention accepts control data scripts including control data and command directives from third-party systems. In order to interpret and use previously entered closed-caption data using a third-party system, embodiments of the present invention include functionality for parsing third-party scripts comprising control data and command directives to complete the output arrays that are used to create the control data waveforms.

In addition, as FIG. 5 indicates, the apparatus of the present invention allows for certain options when the user manually scripts the entry of control data. The "Delay Value" option allows the user to omit the entry of time codes. In this instance, if no time code is specified with a particular command directive or control data, the apparatus assigns a time code for a particular caption according to the delay specified in the Delay Value box. For example, if pop-up or paint-on closed caption displays are used, the Delay Value is the time between successive pop-up or paint-on captions. The apparatus loads each closed-caption into the data arrays, discussed below, according to the delay value, if no time code is specified. Furthermore, if roll-up display is used, the Delay Value represents the time between the display of each line in the roll-up caption.

In addition, the Duration values sets the minimum running time of the output. More specifically, the Duration value allows the specification of an MPAA rating, for example, only once and its placement into the time-points of the data arrays spanning the specified duration. Furthermore, the "Time Code Offset" option allows for the re-mapping of time code values that are beyond the one-hour value into values which the apparatus can use.

2. Data Structures for Storing Control Data

As discussed above, the present invention inserts the inputted control data into a data structure contained in the memory of computer 20. In one embodiment, scripting module 24 parses a control data script containing control data and command directives and inserts control data into a data structure as specified by the associated command directives. In one form, one or more elements of the data structure correspond to a time point or video frame in the underlying video program data.

In one embodiment for use with EIA-608 compliant devices, the data structure comprises two linear arrays of sufficient capacity to store one hour of the Field 1 packet data values and one hour of the Field 2 packet data values, respectively. Of course, any suitable data structure can be used. In NTSC non-drop frame video thirty individual video frame are assigned to each second. Therefore, one hour of video comprises 108,000 (30×60×60) frames. In drop frame nomenclature this number is slightly less. The EIA-608 standard specifies that two 8-bit characters are to be sent with each of the two field packets of each video frame. The memory required to send Line 21 data for both fields for one hour's worth of video frame is, therefore (2×2×108,000) 432,000 bytes. Accordingly, one embodiment of the present invention includes two arrays: one for Field 1 packet data and one for Field 2 packet data. Each pair of data elements in each array corresponds with a particular time code beginning with 00:00:00:00 and ending with 1:00:00:00 (Hours:Minutes:Seconds:Frames).

FIGS. 3A, 3B, and 3C set forth a method for inserting control data into a data structure of the present invention. In one embodiment, scripting module 24 initializes the odd and even arrays and initializes the odd and even array pointers (FIG. 3A, step 100). In one embodiment, the two linear data arrays are filled as follows: If closed-caption input is taken from the WYSIWIG editor (step 102), the appropriate closed-caption data values are generated according to EIA-608 specifications and the FCC Report and Order of Apr. 12 1991 (FCC 91-119), setting forth the standard control codes for closed-caption decoders, (which is incorporated herein by reference) and placed sequentially into the Field 1 packet data array staring at 0:00:00:00 (step 104). If Content Advisory (FIG. 3C, step 138), interactive television links and/or program information (step 142) is specified using the dialog boxes in FIGS. 5, 8, 9, 10, 11, 12 and 13, data values according to the respective specifications are generated and placed sequentially into the appropriate data array (steps 140 and 144, respectively). The conversion of control data into the appropriate control codes can occur either when the control data is inserted into the data structure or when pixel representations of the control data are generated. In a preferred embodiment, however, conversion of control data into the appropriate control codes is performed when the control data is inserted into the data structure.

If input is taken from a computer window or from an external file (FIG. 3A, step 106), the command directives are parsed and control data is placed into the appropriate Field 1 or Field 2 packet data array at the appropriate time-point (see steps 108–136). The EIA-608 specification, incorporated herein by reference, specifies in which Field certain control data should be placed for embodiments complying with such specifications. In one embodiment, captions and Interactive Television Links are placed first due to their critical timing nature. Next, program rating information and program information are placed into the array. In addition and in one embodiment, a user may use the dialog boxes to fill the arrays with Content Advisory or other information and then manually script different Content Advisory or other information to be entered at specific time points and overwrite the previously entered data in the control window.

B. Generating Pixel Representations of Control Data

In the embodiment described above, each pair of characters in the respective output arrays (Field 1 and Field 2 packet data) represents the data for one frame at a particular time point that will appear on Line 21 of the VBI. Once all of the data is encoded and inserted into the output arrays, one embodiment of the present invention generates pictorial representations in gray-scale of the Line 21 waveforms for each frame. In one embodiment, the Field 1 and Field 2 packet gray scale data waveforms are placed into a digital picture image that is 720 pixels wide by 486 pixels high. The dimensions of the image frame generated by the invention are not limited by the invention; rather, the dimensions of the image frames depend on the requirements of the media and video editing system. These frames are then merged as part of a multimedia file, such as a Quick Time® file, or stored separately as sequentially-numbered images files, such as PICT files. Of course, any suitable digital image, movie or multimedia file format, such as the AVI file format, can be used in the present invention.

FIG. 4 illustrates an embodiment of a method for generating pixel representations of the control data using the data structure described above. In one embodiment, the user is prompted for the form of the output (FIG. 4, step 202). In one embodiment, the user can specify the output as a Quick Time multimedia file or as a series of sequentially numbered image files, such as a PICT file. Next, the pointers for the Field 1 and Field 2 packet arrays are initialized (step 204). If the pointer is not at the end of the Field 1 and Field 2 packet arrays (step 206), data file waveform generator 26 retrieves the control data from the Field 1 and/or Field 2 packet arrays (step 208) and constructs the Line 21 waveforms for that frame (step 214). Specifically, the binary representation of the two control data values from the Field 1 array are encoded into a liners series of pixels. In one embodiment, control data is encoded into a linear series of 720 pixels according to EIA-608 specification, including the Clock Run-In and Start Bits. The resulting pixel representations are, in one embodiment, copied onto at least one line of the output image frame. Next, the binary representation of the two character data values from the Field 2 array are encoded in a similar manner and put onto at least one line of the output image frame. The resulting image file is then converted and output as a Quick Time frame or as a sequentially numbered file in PICT image format (step 216). Of course, any suitable file format, such as the AVI file format, can be used. This process is repeated until the pointer is at the end of the data arrays. (See FIG. 4, steps 220, 206, and 222).

In one embodiment, when the user specifies a multimedia output (step 202), such as a Quick Time file or other file format that supports references to previous frames, data file waveform generator 26 determines whether the control data for the current frame has been used in a previous frame (step 210). If so, data file waveform generator 26 builds a reference to the previous video frame (step 212).

Figure 1:
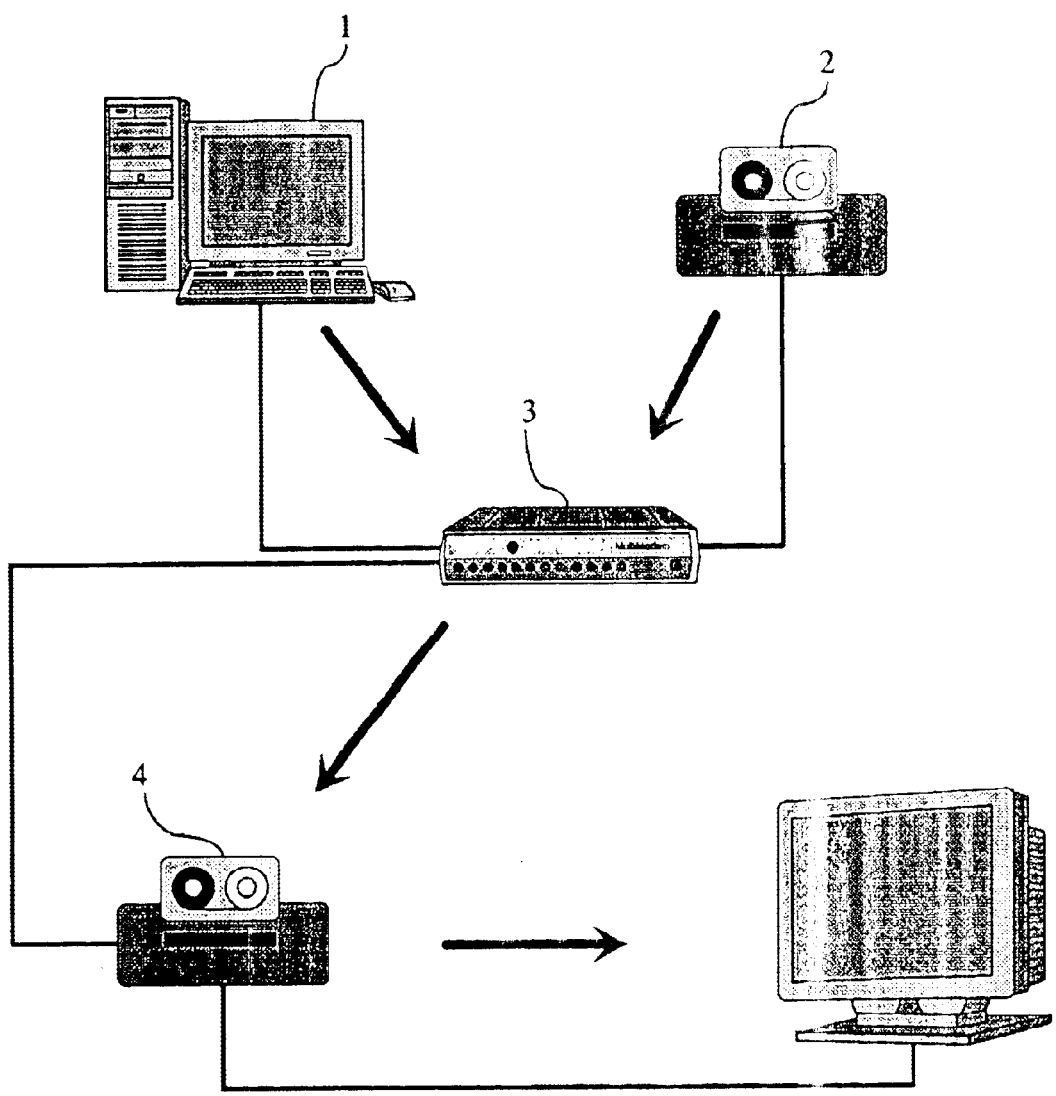
FIG. 1 is a block diagram of a typical prior art closed captioning system.
Figure 2:
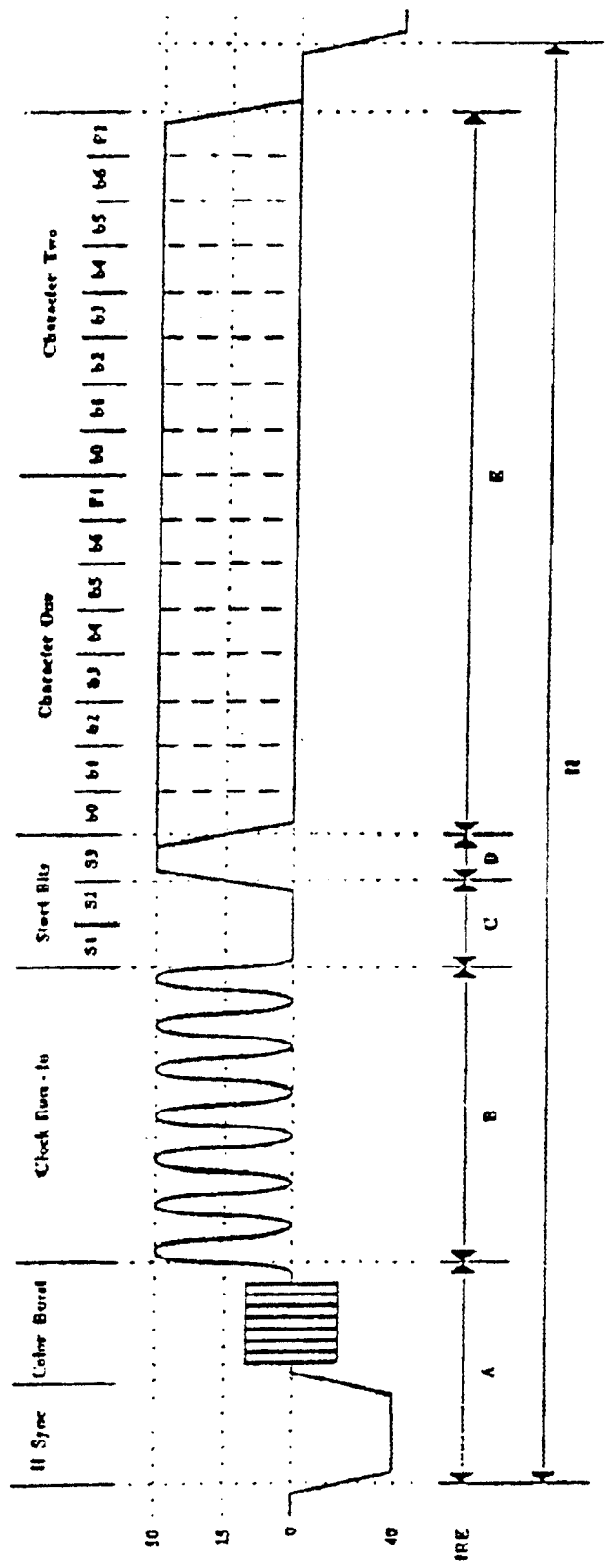
FIG. 2 illustrates the Line 21 Waveform according to EIA-608 specifications.

To be used by currently available television systems, the Field 1 and Field 2 packet waveforms must adhere to the standards set forth in Reference EIA-608. See FIG. 2. Starting with the Clock Run-In Bits and Start Bits, a gray scale representation of the waveform shown in FIG. 2 is constructed. Typically, some non-linear editing systems strip off the H Sync and Color Burst portions of the Line 21 waveform. Accordingly, those portions of the Line 21 waveform need not be recreated in the gray-scale waveform in embodiments that are used in conjunction with such NLEs. As more fully described below, gray-scale bit representations of the control data stored in the two output arrays are placed into the gray-scale waveforms according to EIA-608 Line 21 specifications. See Segment E of FIG. 2. In one preferred embodiment, for each frame, the Field 1 packet waveform is created on both lines 1 and 482 of a picture image, while the Field 2 packet waveform is placed on lines 2 and 483. The rest of the picture image corresponding to each frame is set to black (zero gray-scale value).

In some embodiments, in order to create Line 21 waveforms that a non-linear editing system will properly convert into data readable by a closed-caption decoder or other decoder, the software must replicate the horizontal spacing of the Line 21 waveforms as it is digitized by the particular non-linear editing system that will be used to merge the video and control data. The horizontal spacing of the Line 21 waveform has been found to differ among computer video editing system vendors but appears to be the same within a specific vendor's hardware line. For example, the mid-point of the maximum value of first Clock Run-In cycle is located at pixel 35 for an Avid video NLE system with the Avid Broadcast Video Board (ABVB) hardware board set. The Apple Macintosh based Media 100 video NLE system with software Release 5 places the midpoint of the maximum of the first Clock Run-In cycle at pixel 26. The pixel-column positions associated with the Clock Run-In, Start Bits and Character Bits can be determined for any non-linear editing system by digitizing a known reference signal containing closed caption data in a digital non-linear editing system and examining the picture line corresponding to Line 21 of the digitized signal. An inverse computer software algorithm can then be created to replicate the horizontal spacing of the Clock Run-In, Start Bits and Character Bits for that particular editing system.

Similar to the horizontal spacing of the gray-scale waveform discussed above, the gray-scale data values of the waveform, in some embodiments, must be configured to achieve the appropriate luminance levels (measured in IRE units). It is important to determine the gray-scale data value that causes the NLE system output to have a video level of 50 IREs, according to EIA-608 specifications. Of course, different specifications may require different IRE levels. This gray-scale data value is the gray scale value for the pictorial representation of the waveform. For example, when using an AVID system, the gray-scale value of 30,000 of 16-bit gray scale achieves a 50 IRE level. The minimum gray scale value is set to zero. The gray-scale data values along the pixel points in the waveform vary between this maximum and minimum according to the EIA-608 specification. See FIG. 2. More specifically, the gray scale image is created by first determining the relative intensity of the pixel that is needed at a given location to create the desired EIA-608 specification IRE level and then by inserting that data value into the red, blue, and green components of the pixel.

To allow for different techniques for merging the images containing the pixel representations of the control data and the underlying video data, in one embodiment, the resulting pixel representations of the control data in the Field 1 packet array are copied onto line 0 and line 482 of the output image. The binary representation of the two character data values from the Field 2 array are encoded in a similar manner and put onto line 1 and line 483. However, different NLEs from the same or other manufactures may require that the Field 1 and Field 2 packet waveforms be placed on different rows of the picture image, because the hardware mapping from a row of the picture image to Line 21 of the VBI varies among NLE manufacturers and NLE systems. For example, it has been found that, when using an NLE system including the Avid Media Composer with an ABVB set, the Line 21 waveforms must be mapped on lines 0 and 482 for the Field 1 waveform and lines 1 and 483 for the Field 2 waveform. A non-linear editing system that includes the Media 100 release 5 software for the Macintosh platform requires that the Field 1 waveform be placed on lines 1 and 481 and that the Field 2 waveform be placed on lines 2 and 482. In addition, the duplication of the waveform on different lines in the picture images is not essential to the practice of the present invention. Rather, as described below, the placement of duplicate waveforms allows for use of different editing techniques to merge the video data file with the control data image file.

As discussed above, when output is requested the apparatus fills the two linear data arrays and then generates either multimedia or movie file or sequentially numbered image files from these arrays. This resulting video image file(s) is(are) then imported into a video non-linear editing system and placed on that system's editing time line. The data contained within the imported file is then combined with the underlying video material using the video NLE system. In one preferred form, combining the imported data with video program material within the video NLE system can be accomplished with a Picture-In-Picture effect or with an Alpha channel image. Of course, other techniques such as image cropping could be used.

The PIP effect is used to position the Line 21 data value line contained within the imported control data image onto an image line within the video NLE system that will be mapped onto Line 21 of the VBI on output. For the Avid video NLE, the PIP effect is used to position data lines 482 and 483 of the control data image to the top of the underlying video image. The remainder of the control data image physically above lines 482 and 483 in the PIP lies beyond the mappable regions of the non-linear editing system and, thus, do not merge in the resulting video. On a Macintosh based Avid Media Composer NLE system running Version 7 Avid Software, the Size Parameter of the PIP should be set to 100 percent and the Vertical position should be set to −991. In one embodiment, the resulting merged video data file is output to a video playback and recording device 40, such as a VCR, which records the encoded video data.

An alternate method of combining the imported control data with video material is through the use of an alpha mask image. Typically, the pixel positions in the alpha mask that are white, a 255 luminance value, allow the imported image to be output and pixel positions that are black, a 0 luminance value, allow the program video material to be output. For this operation on an AVID NLE system, for example, the gray scale lines that are located on row 0 and row 1 in the picture image of the imported file are used by the NLE system. The alpha channel mask is configured to select these two rows.

C. Digital Video (DV) formats

Embodiments of the present invention also encode control data into digital video file formats, such as video data stored on helical-scan digital video cassettes. Unlike analog video data streams, digital video data streams do not include a vertical blanking interval. Rather, the digital video data stream includes video, audio, and auxiliary data portions for each frame in repeating succession. Accordingly, the digital video player constructs each frame including the vertical blanking interval as part of the streaming analog signal, which is output during playback of the digital video data stream.

According to the invention, binary representations of control data as contained in the data structure, rather than pixel representations described above, are inserted into the auxiliary portions of the digital video data stream. In one embodiment, control data is inputted into the system. In one embodiment, the control data is converted into the appropriate byte code representations and temporally arranged in a data structure comprising Field 1 and Field 2 packet data arrays, as described above. The control data information within the data structure is then merged with the underlying digital video data file.

One embodiment of the present invention employs the data structures and methods of inserting control data into such data structures, described above. (See FIGS. 3A, 3B, and 3C, as well as related description). Unlike the embodiment described above, however, computer 20 does not include data file waveform generator 26 that generates pixel representations of control data. Rather, computer 20 includes a module that inserts control data from the data structure into the digital video data stream according to the standards and protocols required by the digital video format being used. For example and in one embodiment, control data is merged according to the protocols specified in International Standard International Electrotechnical Commission (IEC) 61834, parts 1–5, of Helical Scan Digital Video Cassette Recording System Using 6,35 mm Magnetic Tape for Consumer Use (1st Ed. 1998), which is incorporated herein by reference, and is available at "http://www.iec.ch/."

FIG. 17 illustrates an embodiment of a method for inserting control data into a digital video data stream. In one embodiment, digital video data is loaded and processed on a frame-by-frame basis in computer 20 where the control data is inserted into the copy of the data file corresponding to a frame stored in RAM. The data file corresponding to the frame can then be output to a computer readable medium such as a digital video cassette or stored in a digital video data file resident on the hard drive of computer 20. In one embodiment, the pointers for the Field 1 and Field 2 packet arrays are initialized (step 302). If the pointer is not at the end of the Field 1 and Field 2 packet arrays (step 304), a data file module retrieves the control data from the Field 1 and/or Field 2 packet arrays (step 306) and inserts the control data into the auxiliary data portion of the digital video data stream at the appropriate frame or time point (step 308). In one embodiment, the digital video data file is further edited to ensure that the control data is compatibly merged (step 310), such as changing checksum values to reflect the addition of control data. The changes required to the digital video data file depend on the digital video file format being used. For example, the International Standards, discussed above, describes the changes required to add data to the auxiliary data portion of the digital video data file. This process is repeated until the pointer is at the end of the data arrays. (See FIG. 17, steps 312, 304, and 322).

Although embodiments have been described as implemented on an Apple Macintosh computer, porting the software algorithms to other computer architectures, such as the Intel based PC architecture, and using PC data and extensions to the AVI file format similar to QuickTime, for example, is straightforward. Moreover, the present invention is not limited to the file formats described above. Use of other file formats, such as JPEG, TARGA, TIFF, among others, are also capable of being implemented in the present invention. Although the use of only two video non-linear editing systems, one from Avid Technology and one from Media 100, have been described, the present invention, is easily adapted to any hardware device that can output an array of data storage elements to a line or lines of the vertical blanking interval.

What is claimed is:

1. A method for encoding control data in a video data file, the video data file comprising at least one video frame, said method comprising:

generating an image data file comprising a video frame including a pixel representation of desired control data in at least one line of the video frame; and merging the generated video frame in said image data file with a desired video frame in the video data file to produce a master video data file, wherein the pixel representation of the desired control data is mapped onto a line in the vertical blanking interval of the desired video frame.

2. The method of claim 1, further comprising recording said master video data file on a suitable storage medium.

3. The method of claim 2 wherein said storage medium is a video cassette.

4. The method of claim 1, wherein said image data file is merged with said video data file using a video editing system.

5. The method of claim 1 wherein said pixel representation of desired control data spans across one horizontal line of a corresponding video frame of said image data file.

6. The method of claim 1 wherein said pixel representation of desired control data comprises at least two lines of a corresponding video frame of said image data file.

7. The method of claim 1 wherein said pixel representation further includes an initialization sequence.

8. The method of claim 1 wherein the image data file comprises a plurality of video frames, each including a pixel representation of desired control data in at least one line of the corresponding video frame; the method further comprising, repeating the merging step for a desired number of video frames in the image data file.

9. The method of claim 1 wherein said pixel representation are mapped to Line 21 of the vertical blanking interval of said desired video frame of said video data file.

10. A method for encoding control data in a video data file, the video data file including at least one video frame, said method comprising:

(a) receiving control data;

(b) generating an image data file comprising a video frame including a pixel representation of said control data in at least one line corresponding to a line in the vertical blanking interval of an underlying video frame; and, (c) merging a video frame in the image data file with a desired video frame in the video data file.

11. The method of claim 10 wherein a line in the video frame of said video data file corresponds to a line in the vertical blanking interval, and wherein said pixel representation of said control data is mapped to the corresponding line in the vertical blanking interval of said video frame of the merged video data file.

12. A method for encoding control data in a video data file, the video data file comprising at least one video frame, said method comprising:

(a) receiving a control data script, said control data script comprising command directives and control data;

(b) inserting said control data in a data structure according to said command directives, wherein elements of said data structure represent time points; and, (c) for at least one element in said data structure, generating a control data image frame intended for subsequent merger with a desired video frame in the video data file, wherein the control data image frame comprises a pixel representation of corresponding control data in a line of the control data image frame corresponding to a line in the vertical blanking interval.

13. The method of claim 12 further comprising the step of
(d) merging said control data image frame with a desired video frame in said video data file.

14. The method of claim 13 wherein said pixel representation is a gray-scale pixel representation.

15. The method of claim 13 wherein said merging step (d) comprises mapping said pixel representation to a line corresponding in the vertical blanking interval of the desired video frame in said video data file.

16. The method of claim 14 merging step (d) comprises mapping said pixel representation to a line corresponding in the vertical blanking interval of the desired video frame in said video data file.

17. The method of claim 12 wherein said data structure comprises an array.

18. The method of claim 12 wherein said data structure comprises two parallel arrays.

19. The method of claim 18 wherein the elements in said parallel arrays corresponds to the video frames in said video data file.

20. A method for encoding control data in a video data file, the video data file comprising at least one video frame, said method comprising:
receiving a control data script, said control data script comprising command directives and control data;
converting said control data into byte code representation according to a predetermined specification;
inserting said converted control data in a data structure according to said command directives, wherein elements in said data structure represent time points; p1 generating a sequence of control data video frames each having a pixel representation of converted control data in a line of the video frame; and
mapping the pixel representations of converted control data in said sequence of control data video frames to corresponding lines in the vertical blanking interval of desired video frames in the video data file.

21. The method of claim 20 wherein the control data comprises closed-caption data.

22. The method of claim 21 wherein said pixel representations are gray-scale pixel representations.

23. The method of claim 20 wherein said mapping step comprises mapping said pixel representations to Line 21 of the vertical blanking interval of the desired video frames in said video data file.

24. The method of claim 20 wherein said mapping step comprises mapping said pixel representations to the vertical blanking interval of the desired video frames in said video data file.

25. The method of claim 20 wherein said data structure comprises an array.

26. The method of claim 20 wherein said data structure comprises two parallel arrays.

27. The method of claim 26 wherein the elements in said parallel arrays corresponds to the video frames in said video data file.

28. A method for adding control data to an underlying video data file, the video data file comprising at least one video frame, said method comprising the steps of
(a) generating a control data image data file comprising a sequence of image frames, said image frames each including a linear pixel representation of desired control data;

(b) merging, within the context of a video editing system, an image frame in said control data image data file with a desired video frame in the video data file by mapping the linear pixel representation of said control data to a line in the desired video frame corresponding to a line in the vertical blanking interval.

29. An apparatus for encoding control data in a video data file, the video data file comprising at least one video frame, comprising:
a user interface facilitating input of control data;
means for generating a control data image file comprising a control data video frame having a pixel representation of said control data in a line of the control data video frame corresponding to a line in the vertical blanking interval of the control data video frame, wherein the control data video frame is intended for subsequent merger with a desired video frame in the video data file.

30. The apparatus of claim 29 further comprising
means for adding the video frame having said pixel representation of said control data to a desired line in the vertical blanking interval of the desired video frame in said video data file.

31. An apparatus according to claim 29 wherein said generating means generates pixel representations of control data according to a predetermined specification.

32. The apparatus of claim 29 wherein said user interface facilitates input of command directives, and wherein said apparatus further comprises:
a computer readable memory including a data structure, wherein elements of said data structure represent time points;
processing means for inserting said control data in said data structure according to said command directives; and,
wherein said generating means generates a video frame comprising a pixel representation of the corresponding control data in at least one line of the video frame corresponding to the vertical blanking interval.

33. The apparatus of claim 29 wherein said user interface facilitates entry of an external data file comprising control data and command directives.

34. An apparatus for encoding control data in a video data file, said video data file including at least one video frame having a vertical blanking interval, comprising:
a video editing device, wherein said video editing device maps at least one line of the video data file to one line of the vertical blanking interval of a video frame;
a user interface facilitating input of control data and command directives;
a computer-readable memory, said computer readable memory storing said control data and command directives;
processing means associated with said memory for generating a control data image file comprising a video frame having a pixel representation of said control data;
wherein said video editing device merges said video frame having said pixel representation of said control data with a desired video frame of an underlying video data file according to said command directives, and maps the pixel representation of said control data to a desired line in the vertical blanking interval of the desired video frame.

35. The apparatus of claim 34 wherein said video editing device maps said pixel representations of said control data to line 21 in the vertical blanking interval of said desired video frame of video data file.

36. The apparatus of claim 34 wherein said memory includes a data structure, and wherein said processing means further stores said control data in said data structure according to said command directives.

37. The apparatus of claim 36 wherein elements in said data structure correspond to video frames in said video data file.

38. An apparatus for encoding control data to video data file, said video data file including at least one video frame having a line corresponding to a line of the vertical blanking interval, comprising:

video editing means for mapping video data;
wherein said video editing means maps at least one line of the vertical blanking interval of video frames of said video data file;

first video image storage means associated with said video editing means for storing the video data;

a user interface facilitating input of control data and command directives;

a computer-readable memory, said memory storing said control data and said command directives;

processing means associated with said input means and said memory for generating a sequence of images frames, at least one of said image frames comprising a pixel representation of said control data in a line of the image frame;

wherein said video editing means is coupled to said first video image storage means and said processing means for merging said pixel representations of said control data in said sequence of image frames to corresponding lines in the vertical blanking interval of said desired video frames of video data file.

39. The apparatus of claim 38 further comprising means for converting said control data into byte code representations of said control data.

40. The apparatus of claim 38 wherein said processing means generates said sequence of image frames according to said command directives.

* * * * *

UNITED STATES PATENT AND TRADEMARK OFFICE
CERTIFICATE OF CORRECTION

PATENT NO. : 6,895,166 B1
DATED : May 17, 2005
INVENTOR(S) : Jeffrey A. Schriebman It is certified that error appears in the above-identified patent and that said Letters Patent is hereby corrected as shown below:

Column 13,
Line 30, replace "representation" with -- representations --
Line 59, replace "corresponds" with -- correspond --

Column 16,
Line 2, replace "images" with -- image --

Signed and Sealed this

Twelfth Day of July, 2005

JON W. DUDAS
*Director of the United States Patent and Trademark Office*